United States Patent [19]

Ueji et al.

[11] Patent Number: 5,112,888

[45] Date of Patent: May 12, 1992

[54] EPOXY RESIN COMPOSITION CONTAINING LONG CHAIN ALIPHATIC DIACIDS AND/OR DIPHENYLOL DERIVATIVES

[75] Inventors: Kazufumi Ueji, Kasukabe; Yoshihiro Motoki, Misato; Akira Shinozuka, Matsudo, all of Japan

[73] Assignee: Somar Corporation, Japan

[21] Appl. No.: 551,810

[22] Filed: Jul. 12, 1990

[51] Int. Cl.$^5$ ............... C08L 63/00; C08F 283/00; C08G 8/28
[52] U.S. Cl. ........................ 523/443; 523/427; 525/482; 525/533; 525/934; 528/112
[58] Field of Search ............... 523/427, 443; 525/482

[56] References Cited

U.S. PATENT DOCUMENTS

| | | | |
|---|---|---|---|
| 4,214,068 | 7/1980 | Schreurs et al. | 528/98 |
| 4,251,426 | 2/1981 | McClure et al. | 528/103 |
| 4,526,940 | 6/1985 | Seymour et al. | 528/98 |
| 4,549,000 | 10/1985 | Widmer et al. | 528/98 |
| 4,720,515 | 1/1988 | Iji et al. | 525/476 |
| 4,876,324 | 10/1989 | Nakano et al. | 528/142 |
| 4,897,460 | 1/1990 | Sakamoto et al. | 528/113 |

FOREIGN PATENT DOCUMENTS 61-127771  6/1986  Japan .

OTHER PUBLICATIONS

C.A. 102(14): 114541g, "Epoxy Resin Compositions".
C.A. 102(12): 96487n, "Brominated Epoxy Resin Compositions".
C.A. 90(18): 139154e, "Thermosetting Epoxy Powdered Coating Compositions".
C.A. 86(14): 91939c, "Hardeners for Resin Powder Coating Compositions".

*Primary Examiner*—John C. Bleutge
*Assistant Examiner*—Frederick Krass
*Attorney, Agent, or Firm*—Lorusso & Loud

[57] ABSTRACT

An epoxy resin composition suitable for encapsulating electric parts is disclosed which includes a mixed epoxy resin composed of a bisphenol epoxy resin and a novolac epoxy resin, and a curing agent selected from the group consisting of (a) aliphatic dicarboxylic acids of the formula:

$$HO-CO-R-CO-OH$$

wherein R represents a divalent, aliphatic hydrocarbyl group containing a divalent, linear skeletal structure having at least 8 carbon atoms, (b) diphenylol derivatives of the formula:

$$HO-C_6H_4-C(CH_3)_2-C_6H_4-(-O-CH(OH)-CH_2-O-C_6H_4-C(CH_3)_2-C_6H_4-)_m OH$$

wherein m is an integer of 0-8, and (c) mixtures thereof.

1 Claim, No Drawings

EPOXY RESIN COMPOSITION CONTAINING LONG CHAIN ALIPHATIC DIACIDS AND/OR DIPHENYLOL DERIVATIVES

BACKGROUND OF THE INVENTION

This invention relates generally to an epoxy resin composition and, more particularly, to a powder coating composition suitable for encapsulating or coating electric parts.

Electric parts such as ceramic condensers, resistor networks, hybrid IC and inductors are generally coated with or encapsulated in an insulating layer. Such an insulting coating is desired to exhibit good elasticity, adhesion strength, electrical insulation and resistance to heat, moisture and chemicals. Additionally, it is highly desirable that the insulation coating should show good "resistance to heat cycle", i.e. it should withstand a large number of repeated cycles of alternate hot and cold conditions.

One known epoxy resin powder coating composition for use in encapsulation of electric parts includes (a) an epoxy resin having a melting point of 50°–150 °C., (b) an acid anhydride hardener, (c) triphenyl phosphine as a curing accelerator, and (d) an inorganic filler (Japanese Published Unexamined Patent Application No. 61-89271). While this composition shows satisfactory resistance to heat and moisture, there involves a problem that the resistance to heat cycle is poor.

To improve resistance to heat cycle, there are proposals to use a flexible epoxy resin and an aliphatic acid anhydride hardener. While such a composition has an improved resistance to heat cycle, they are poor in resistance to heat and moisture.

SUMMARY OF THE INVENTION

It is, therefore, an object of the present invention to provide an epoxy resin composition which is suitable for coating or encapsulating electric parts.

Another object of the present invention is to provide an epoxy resin composition of the above-mentioned type which can give hardened layers with excellent resistance to heat cycle, chemicals, moisture and heat.

In accomplishing the foregoing objects, there is provided in accordance with the present invention an epoxy resin composition which comprises a mixed epoxy resin composed of a bisphenol epoxy resin and a novolac epoxy resin, and a curing agent selected from the group consisting of (a) aliphatic dicarboxylic acids of the general formula (I):

HO—CO—R—CO—OH       (I)

wherein R represents a divalent, aliphatic hydrocarbyl group containing a divalent, linear skeletal structure having at least 8, preferably 8-22 carbon atoms, (b) diphenylol derivatives of the general formula (II):

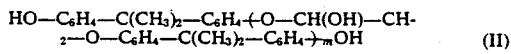

(II)

wherein m is an integer of 0-8, preferably 0-6 and (c) mixtures thereof.

Other objects, features and advantages of the present invention will become apparent from the detailed description of the invention to follow.

DETAILED DESCRIPTION OF THE INVENTION

The mixed epoxy resin to be used in the present invention is solid at room temperature and preferably has a melting point of 50°–90 °C. for reasons of showing suitable viscosity when melted. The bisphenol epoxy resin as one of the components of the mixed epoxy resin is preferably a bisphenol A epoxy resin or bisphenol F epoxy resin, while the novolac epoxy resin to be used as the other component of the mixed epoxy resin is preferably a cresol novolac epoxy resin or a phenol novolac resin.

The use of a combination of a bisphenol A epoxy resin and a cresol novolac epoxy resin is especially preferred. It is also preferable to use these two epoxy resins in a proportion so that the mixed epoxy resin has an epoxy equivalent of 350–1,000.

Especially preferred is the use of a combination of a bisphenol A epoxy resin having an epoxy equivalent of 180–2,500 and a cresol novolac epoxy resin having an epoxy equivalent of 180–230, with the weight ratio of the bisphenol A epoxy resin to the cresol novolac epoxy resin ranging from 40:60 to 80:20.

The divalent, linear skeleton of the group R of the aliphatic dicarboxylic acid of the formula (I) may optionally contain one or more substituents such as a phenyl group, a vinyl group and lower alkyl groups (e.g. methyl, ethyl, propyl, isopropyl, n-butyl and tert-butyl). Illustrative of suitable groups represented by the symbol R are as follows:

alkylenes such as $-(CH_2)_8-$ and $-(CH_2)_{18}-$.       (a)

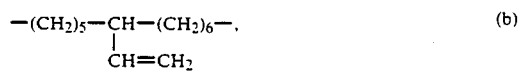

(b)

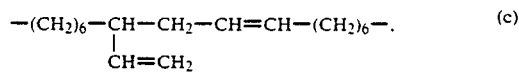

(c)

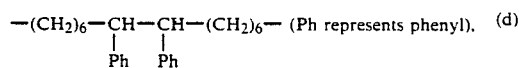

(d)

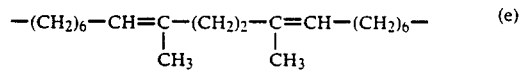

(e)

As the curing agent for hardening the above mixed epoxy resin, the composition of the present invention uses the specific dicarboxylic acid of the above formula (I) and/or specific phenylol derivatives of the above formula (II). By this, the epoxy resin composition can give hardened layer having excellent resistance to moisture, heat and chemicals as well as resistance to heat cycle and mechanical shock. It is preferred that the dicarboxylic acid and the phenylol derivative be conjointly used for reasons of improving the above-mentioned desired properties. In this case, the diphenylol derivative is generally used in an amount of 0.3–1.5 parts by weight, preferably 0.7–1.2 parts by weight per part by weight of the dicarboxylic acid. The curing agent is generally used in an amount of 0.6–1.5 equivalents, preferably 0.7–1.2 equivalents per equivalent of epoxy groups of the mixed epoxy resin.

A curing accelerator is preferably used. Examples of suitable accelerators include imidazoles such as 2-methylimidazole and 2,4-diamino-6- 2- methylimidazole(1) ethyl-s-trizine; amides such as dicyanodiamide; diaza compounds such as 1,8-diaza-bicyclo(5,4,0)undecene-7 and salts thereof; and phosphines such as triphenylphosphine. Above all, the use of triphenylphosphine is particularly preferred since good elasticity is obtainable. The accelerator is generally used in an amount of 0.2–5 parts by weight, preferably 0.5–3 parts by weight.

It is also desirable to incorporate an inorganic filler into the composition. Examples of suitable inorganic fillers include silica, calcium carbonate, dolomite, calcium silicate, alumina, mica, talc, and glass fiber powder. The use of silica, especially divided silica and molten silica having a small aspect ratio is particularly preferred because of improved resistance to heat cycle. The inorganic filler treated with a silane coupling agent such as epoxysilane, 2-(3,4-epoxycyclohexyl)-ethyltrimethoxysilane or 3-glycidoxypropylmethoxysilane may be used. The inorganic filler generally has an average particle of 0.5–75 μm, preferably 3–50 μm. The amount of the inorganic filler is generally 50–150 parts by weight, preferably 80–120 parts by weight per 100 parts by weight of the mixed epoxy resin.

The epoxy resin composition may further contain a a mixture of a brominated aromatic compound and diantimony trioxide as a flame retardant. The brominated aromatic compounds include, for example, hexabromobenzene, bromophenol, hexabromodiphenyl ether and decabromodiphenyl ether. The weight ratio of the brominated aromatic compound to the diantimony trioxide is generally in the range of 10:3 to 10:7, preferably about 1:1. The flame retardant is generally used in an amount of 15–40 parts by weight, preferably 20–25 parts by weight per 100 parts by weight of the mixed epoxy resin.

The epoxy resin composition according to the present invention may further contain various additives such as a leveling agent, e.g. an oligomer of an acrylic ester, a thixotropic agent, e.g. polyvinylbutyral, and a colorant.

For the preparation of the epoxy resin composition in the form of a powder coating composition, the above ingredients are mixed with a suitable mixing machine and the mixture is kneaded in a molten state with a suitable kneader, followed by solidification and pulverization.

The following examples will further illustrate the present invention.

EXAMPLES 1-7 AND COMPARATIVE EXAMPLES 1-3

Epoxy resin powder coating compositions composed of the ingredients shown in Table below were prepared. In the Table, the contents of respective ingredients are indicated in terms of part by weight. The Remarks *1 through *13 are as follows:

*1: Bisphenol A epoxy resin, epoxy equivalent: 1,900–2,100 (manufactured by Yuka-Shell Epoxy Inc.)
*2: Bisphenol A epoxy resin, epoxy equivalent: 170–200 (manufactured by Yuka-Shell Epoxy Inc.)
*3: o-Cresol novolac epoxy resin, epoxy equivalent: 210 (manufactured by Nippon Kayaku K. K.)
*4: Crystalline silica, average particle size: 10 μm (manufactured by Tatsumori Inc.)
*5: Decabromodiphenyl ether (manufactured by Nippoh Kagaku K. K.)
*6: Diantimony trioxide (manufactured by Mikuni Seiren Inc.)
*7: Mixture of diphenylol derivatives of the formula (II) above in which m is 0–8. Major components are the compound of the formula (II) in which m is 0 (i.e. bisphenol A) and the compound of the formula (II) in which m is 2.
*8: $HOOC-(CH_2)_{18}-COOH$ (manufactured by Okamura Seiyu K. K.)
*9: Triphenylphosphine (manufactured by KI Kasei K. K.)
*10: 1,8-Diaza-bicyclo(5,4,0)undecene-7
*11: Dicyanodiamide
*12: 2-Methylimidazole (manufactured by Shikoku Kasei K. K.)
*13: 5-(2,5-Dioxotetrahydrofuryl)-3-methyl-3-cyclohexene-1,2-dicarboxylic anhydride (manufactured by Dainihon Ink K. K.)

The epoxy resin compositions thus prepared were tested for their resistance to heat cycle, moisture and heat in the following manner. The results are also summarized in Table below.

Resistance to Heat Cycle

A ceramic condenser (rated voltage: 15 KV) composed of a dielectric body and electrodes connected thereto is coated with an epoxy resin composition to be tested to form a hardened coat (thickness: 0.5 mm) over the entire surface of the condenser. This is then placed in a heating chamber and heated at 125° C. for 1 hour. Thereafter, the condenser is placed in a cooling chamber and maintained at −40° C. for 1 hour. Such a heating-cooling cycle is repeated 200 times. The resulting condenser is checked to determine whether or not cracks are formed in the coat. Resistance to heat cycle is evaluated as follows:
good: No cracks
poor: Cracks occurred

Resistance to Moisture

A film condenser with an electrostatic capacitance of 0.1 μF is coated with an epoxy resin composition to form a hardened coat (thickness: 0.5 mm). This is then allowed to stand at a temperature of 85° C. a relative humidity of 95% for 200 hours. Thereafter, the capacitance is measured to evaluate resistance to moisture as follows:
good: at least 90% of the initial capacitance
poor: less than 90% of the initial capacitance

Resistance to Heat

A hardened epoxy resin disc having a diameter of 70 mm and a thickness of 3 mm is prepared by molding of an epoxy resin composition. This is placed in a hot air stream at 120° C. for 500 hours. After cooling to room temperature, the specific volume resistivity of the disc is measured to evaluate the resistance to heat as follows:
good: $10^{12}$ ohm.cm or more
poor: less than $10^{12}$ ohm.cm The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

| Example No. | 1 | 2 | 3 | 4 | 5 | 6 | 7 | Comp. 1 | Comp. 2 | Comp. 3 |
|---|---|---|---|---|---|---|---|---|---|---|
| Ingredient | | | | | | | | | | |
| Epikote 1007 *1 | 50 | 50 | 50 | 60 | 40 | 50 | 50 | 50 | 50 | 50 |
| Epikote 828 *2 | 10 | 10 | 10 | 10 | 10 | 10 | 10 | 10 | 10 | 10 |
| Novolak *3 | 40 | 40 | 40 | 30 | 50 | 40 | 40 | 40 | 40 | 40 |
| Silica *4 | 100 | 100 | 100 | 100 | 100 | 100 | 100 | 100 | 100 | 100 |
| Br compound *5 | 20 | 20 | 20 | 20 | 20 | 20 | 20 | 20 | 20 | 20 |
| Antimony oxide *6 | 10 | 10 | 10 | 10 | 10 | 10 | 10 | 10 | 10 | 10 |
| Diphenylol *7 | — | 60 | 30 | 25 | 34 | 25 | 25 | — | — | — |
| Dicarboxylic acid *8 | 50 | — | 25 | 22 | 28 | 22 | 22 | — | — | — |
| Phosphine *9 | 2 | 2 | 2 | 2 | 2 | — | — | — | — | — |
| DBU accelerator *10 | — | — | — | — | — | — | 5 | — | — | — |
| Dicyanodiamide *11 | — | — | — | — | — | — | — | 6 | — | — |
| Imidazole *12 | — | — | — | — | — | 0.5 | — | — | 3 | — |
| Acid anhydride *13 | — | — | — | — | — | — | — | — | — | 10 |
| Heat Cycle Resistance | good | good | good | good | good | good | good | poor | poor | poor |
| Moisture Resistance | good | good | good | good | good | good | good | good | poor | good |
| Heat Resistance | good | good | good | good | good | good | good | poor | poor | good |

What is claimed is:

1. An epoxy resin powder composition consisting essentially of:

100 parts by weight of a mixed epoxy resin comprised of a bisphenol A epoxy resin and a novolac epoxy resin and having an average epoxy equivalent of 350–1,000;

30–80 parts by weight of a curing agent, wherein said curing agent is a mixture comprising (a) an aliphatic dicarboxylic acid of the formula:

HO—CO—R—CO—OH wherein R represents a divalent, aliphatic hydrocarbyl group containing a divalent, linear skeletal structure having 8–22 carbon atoms, and (b) a diphenylol derivative of the formula:

HO—C$_6$H$_4$—C(CH$_3$)$_2$—C$_6$H$_4$—(O—CH(OH)—CH$_2$—O—C$_6$H$_4$—C(CH$_3$)$_2$—C$_6$H$_4$)$_m$OH wherein m is an integer of 0–8, the weight ratio of the diphenylol derivative to the dicarboxylic acid being 3:10 to 15:10;

50–150 parts by weight of silica having an average particle size of 0.5–75 μm;

15–40 parts by weight of a mixture of a brominated aromatic compound and diantimony trioxide, the weight ratio of said brominated aromatic compound to said diantimony trioxide being in the range of 10:3 to 10:7; and 0.5–5 parts by weight of triphenylphosphine.

* * * * *